T. COGSWELL.
Dental-Mirrors.
No. 163,578.  Patented May 25, 1875.
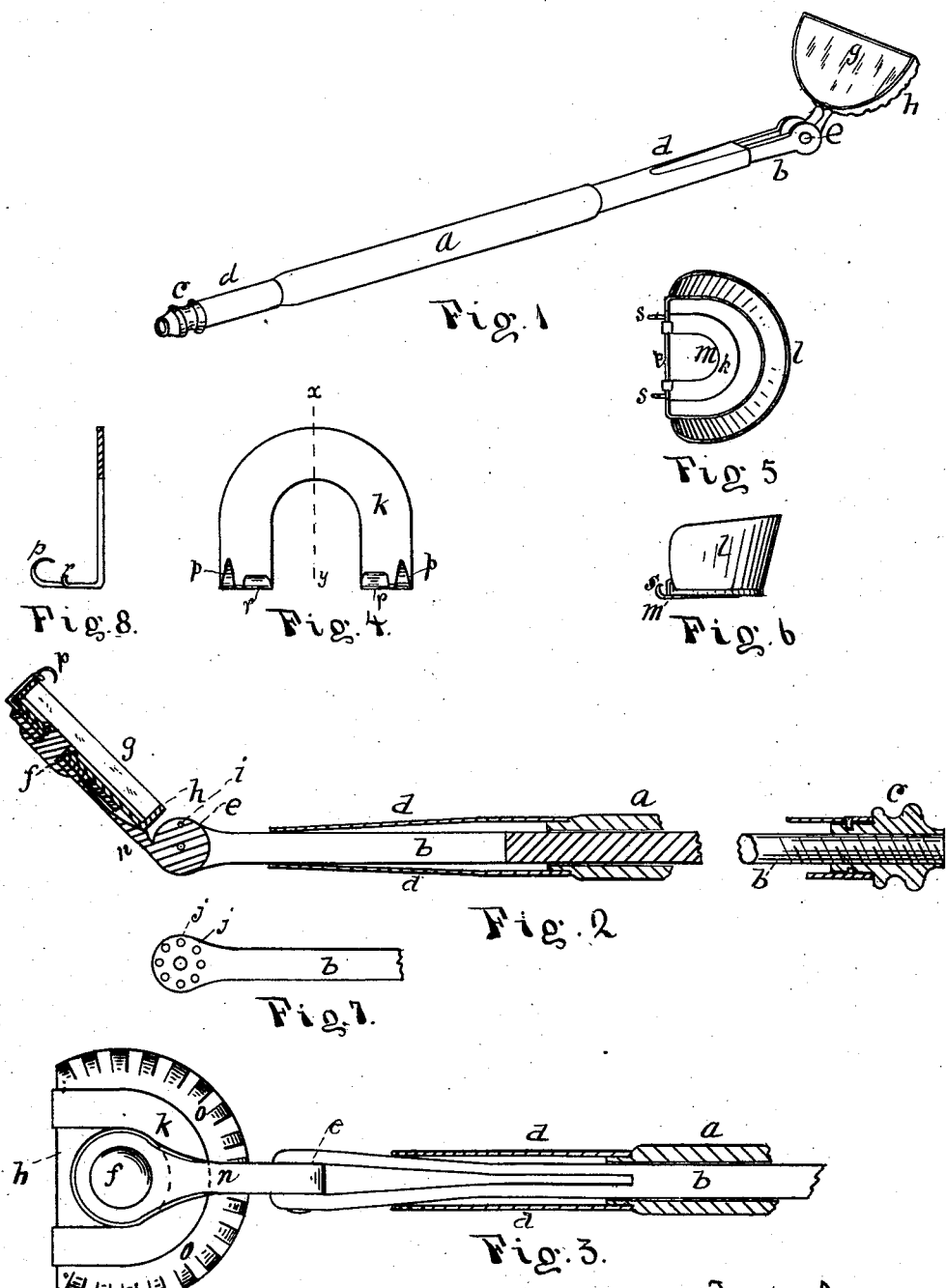

UNITED STATES PATENT OFFICE.

THOMAS COGSWELL, OF BOSTON, MASSACHUSETTS.

IMPROVEMENT IN DENTAL MIRRORS.

Specification forming part of Letters Patent No. 163,578, dated May 25, 1875; application filed March 16, 1875.

*To all whom it may concern:*

Be it known that I, THOMAS COGSWELL, of Boston, in the county of Suffolk and State of Massachusetts, have invented an Improved Dental or Mouth Mirror, of which the following is a specification:

My invention relates to certain improvements in dental or mouth mirrors and attachments thereto, by means of which dental operations are very much facilitated; and the invention consists, first, of a peculiarly-shaped mirror, which is attached to the handle in such a manner as to enable it to be securely fixed in any desired position relatively to the handle, for examining every portion of the mouth and teeth. The invention also consists in a device to be attached to the mirror for holding a napkin or a piece of sheet-rubber when the teeth are being examined or operated upon. The invention further consists in a device, also to be attached to the mirror, for preventing the cheek or tongue from coming in contact with the mirror or operating instrument in examining or operating on the teeth, and also for affording increased light by reflection.

Referring to the drawings, Figure 1 represents the mirror attached to the handle. Fig. 2 is a longitudinal section of the same, enlarged, a portion being broken away in the center. Fig. 3 is a rear view of the mirror, showing the toothed or serrated edge, the napkin attachment, and a section of the handle with the spring clamping device. Figs. 4 and 8 represent the napkin-holding device somewhat enlarged. Figs. 5 and 6 represent the cheek or tongue holding device.

$d$ represents a hollow tube of metal, a portion of which is surrounded by a covering, $a$, of wood, rubber, or other suitable material. Through the tube $d$ passes a shank, $b$, formed with a screw at one end, provided with a nut, $c$, by turning which the shank $b$ is moved forward and back in the tube. The tube $b$ is flattened at the end nearest the mirror. The end of the shank toward the mirror is formed with spring-jaws, as shown in Figs. 1 and 3. Between these jaws is pivoted the shank $n$ of the mirror, as shown at $e$. On the inner surface of one of the jaws is a series of holes, $j\,j$, as seen in Fig. 7, to receive a pin, $i$, in the joint $e$, by which means the shank of the mirror is held at any desired angle with the handle when the jaws are pressed together.

Instead of the holes and pin the adjacent surfaces of the jaws and joint $e$ may be serrated or roughened for the same purpose.

By turning the nut $c$ the shank $b$ is moved to and fro in the tube. When the mirror is fixed at the desired inclination the shank $b$ is drawn into the tube, and the jaws are clamped together and hold the shank $n$ firmly in position.

The mirror is of the form shown in Figs. 1 and 3, being a portion of a circle with a segment removed, which renders it better adapted for the examination of the teeth and mouth than when of a circular or oval form.

The shank $n$ is attached to the back of the mirror by a joint, as shown at $f$, Fig. 3, so as to allow the mirror to turn freely on the joint as a center. The frame of the mirror may be provided with teeth or serrations $o\,o$, Fig. 3, or it may be simply roughened; and the shank $n$ is made elastic and provided with a projection, as seen in Fig. 2, so as to engage with the teeth or serrations; or it may be held simply by friction, and thus retain the mirror with its segment side at any desired angle with the shank $n$.

It will thus be seen that, by means of the combined action of the joints $f$ and $e$, the mirror may be adjusted to any desired position in the mouth.

Fig. 4, of which Fig. 8 is a section, represents, on a large scale, a device to be attached to the mirror for the purpose of securing a napkin or other article used to prevent the moisture in the mouth from coming in contact with the mirror or the teeth while operated upon. It consists of a thin plate of metal, of the form shown in Fig. 4, and as attached to the mirror in Fig. 3. It is held in position on the mirror by means of hooks $r\,r$ catching over the segment edge of the mirror and passing under the spring-shank $n$. The hooks $p$ project over the segment edge, as shown in Fig. 2, and serve to hold the napkin, which is drawn down over the back of the mirror, and held in any convenient way. The device is very readily attached to and detached from the mirror.

Figs. 5 and 6 represent a device for preventing the cheek or tongue from coming in contact with the mirror or teeth, as also the operating instrument. It is formed of a thin sheet of metal, about half an inch, more or less, in width, and extending around rather more than half a circle, the two ends being connected at the base by a bar, $t$, (see Fig. 5,) to which is attached a curved plate of metal, $k$, like the device shown in Fig. 4, for the purpose of securing it to the mirror. The inner surface of the cheek or tongue protector is plated or highly polished, so as to act as a reflector for throwing light upon the mirror and teeth, which adds very much to the utility of the device.

I do not limit myself to the precise form, as shown, of the napkin-holder or the cheek and tongue protector, as they may both be so modified as to be adapted to mirrors of a circular or other form without departing from the spirit of my invention.

The rotating mirror may be attached to a handle by a rigid, instead of a jointed, shank, if desirable.

I am aware that dental mirrors of a circular form have been connected to their handles by means of a ball-and-socket joint. This is objectionable, for the reason that the joint from use soon becomes so worn and loose as to render it inefficient.

By my invention the mirror may be securely held in any desired position relatively to the handle, without liability of the joints becoming loose by constant use.

The peculiar shape of the mirror gives it a very great advantage over those of a circular or oval form, as it admits of a more extended view of the teeth and mouth.

What I claim as my invention, and desire to secure by Letters Patent, is—

1. The mirror $g$, of the form shown in Figs. 1 and 3, pivoted to a shank, $e$, attached to a handle by means of either a jointed or rigid connection, as set forth.

2. A mouth-mirror rotating in its own plane around a point of attachment within said plane, and having provision for retention at any desired point in the same, substantially as set forth.

3. The combination of a mouth-mirror with a movable double-jawed shank, $b$, provided with a locking device, as and for the purpose set forth.

4. A napkin-holding device, in combination with a mouth-mirror, substantially as and for the purpose described.

5. A tongue or cheek holding device, in combination with a mouth-mirror, substantially as and for the purpose set forth.

In testimony whereof I have signed my name to this specification in the presence of two subscribing witnesses.

THOS. COGSWELL.

Witnesses:
JOS. H. ADAMS,
A. M. SHURTLEFF.